July 3, 1923.

S. L. EUSTIS, JR
CONVEYER
Filed May 12, 1919

Witnesses
Frederick L. Fox

Inventor
Samuel L. Eustis, Jr.
By Victor J. Evans
Attorney

July 3, 1923.
S. L. EUSTIS, JR
CONVEYER
Filed May 12, 1919
1,460,952
2 Sheets-Sheet 2
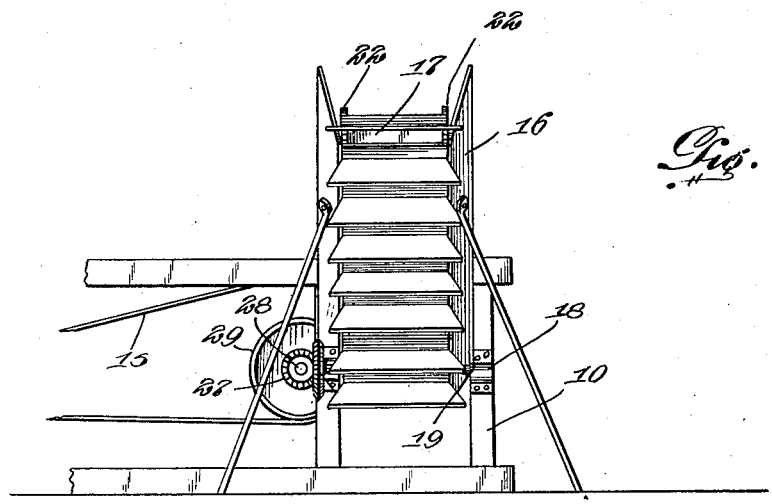
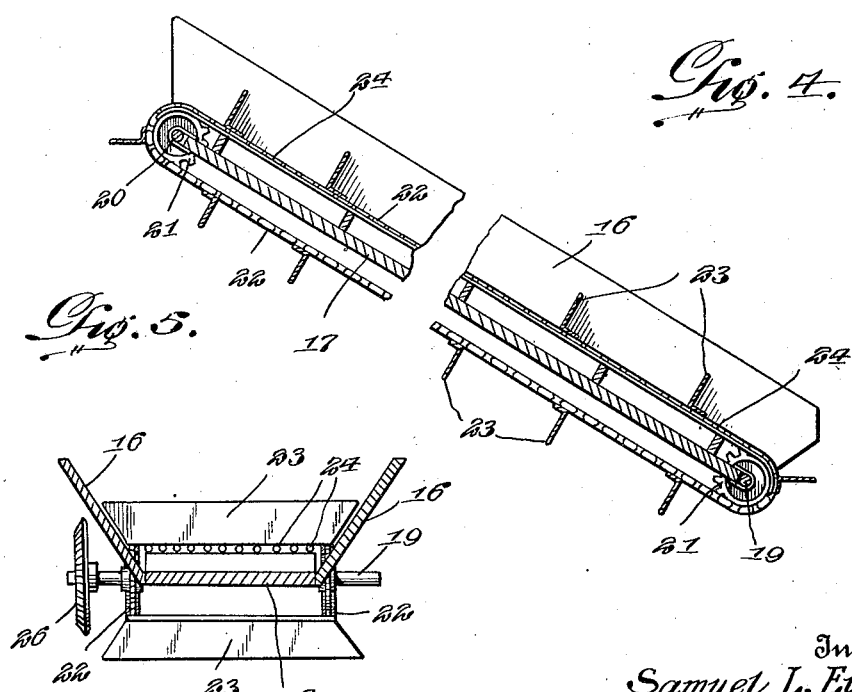
Witnesses
Frederick L. Fox
Inventor
Samuel L. Eustis, Jr.
By Victor J. Evans,
Attorney Patented July 3, 1923.

1,460,952

UNITED STATES PATENT OFFICE.

SAMUEL L. EUSTIS, JR., OF ONAGA, KANSAS.

CONVEYER.

Application filed May 12, 1919. Serial No. 296,455.

*To all whom it may concern:*

Be it known that I, SAMUEL L. EUSTIS, Jr., a citizen of the United States, residing at Onaga, in the county of Pottawatomie and State of Kansas, have invented new and useful Improvements in Conveyers, of which the following is a specification.

This invention relates to improvements in saw machines and aims to provide means operated by the saw operating mechanism for conveying blocks or pieces of wood cut by the saw to some remote point.

Specifically stated, the invention comprises a conveyer, which has one end secured to the frame of the saw in position to receive the blocks or pieces of wood cut, the conveyer being driven by the saw operating means.

One of the principal objects of the invention is to provide a conveyer in which friction is reduced, so as to reduce the amount of power required for its operation to permit of its being driven by the saw driving means, and for this purpose the conveyer is operated over anti-friction ribs or rods, over which the sawed block also travels so that the majority of friction is overcome.

Other objects and advantages of the invention will appear as the following description is read in connection with the accompanying drawings.

In the drawings:

Figure 3 is a side elevation.

Figure 4 is a longitudinal section through the conveyer.

Figure 5 is a transverse sectional view of the same.

Figure 1:
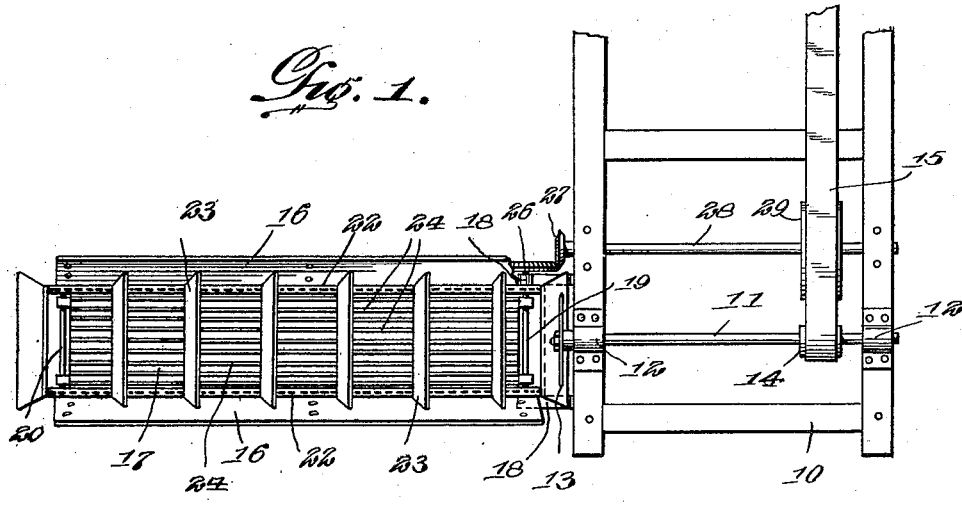
Figure 1 is a plan view of a portion of a saw operating mechanism having the invention applied thereto.
Figure 2:
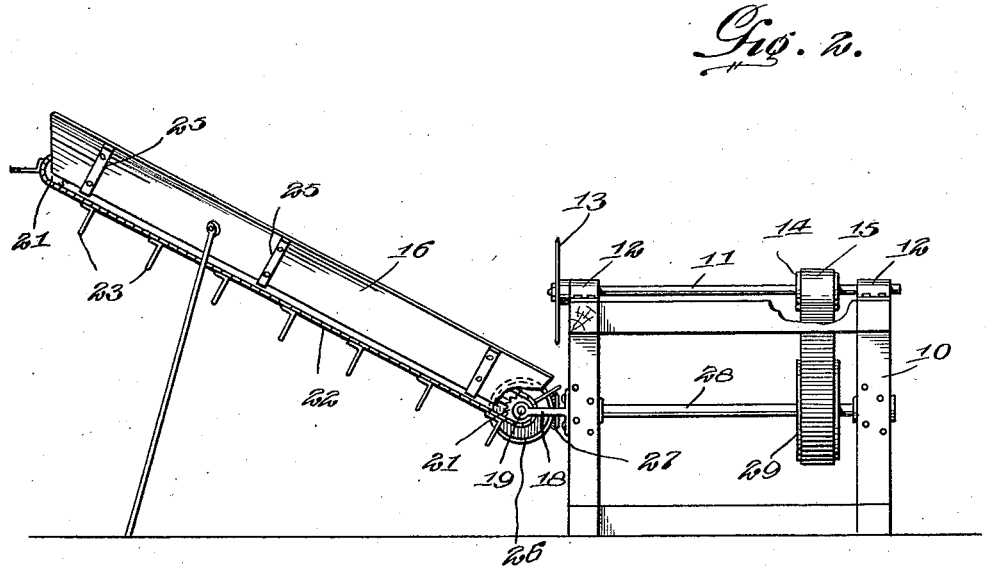
Figure 2 is an end elevation of the same.

Referring to the drawings in detail, wherein like characters of reference denote corresponding parts, the machine includes a frame 10, upon which is mounted a saw shaft 11, operating in bearings 12 secured to the frame. Mounted upon the shaft 11 in the usual manner is a circular saw 13, the shaft also having mounted thereon a pulley 14, which is driven by a belt 15, operated by any suitable source of power.

The conveyer, which includes outwardly inclined side walls 16 rising from and in contacting engagement with the side edges of a downwardly inclined bottom 17, has one end suitably secured to the frame 10, beneath the saw and in proper position to receive the blocks or pieces of wood cut. Mounted in bearings 18, also secured to the frame 10, is a shaft 19, the latter being disposed transversely of the trough formed of the side walls 16 and the bottom 17. At the opposite end of the trough is a transversely disposed shaft 20, the shafts 19 and 20 carrying sprockets 21 arranged upon each side of the trough, over which travels chains 22. Secured to each of the chains and disposed transversely of the trough are substantially L shaped carriers 23, the latter bearing upon and traveling over spaced longitudinally disposed metallic rods 24 arranged longitudinally within the bottom of the trough. The upper flight of the chain operates within the trough and having their ends bent downwardly to conform with the curvature of the turning point of the chains, while the lower flight operates beneath the same. The sides of the trough are held in position by suitable braces 25.

The shaft 19 extends beyond one of the side edges of the trough and has secured thereon a beveled gear 26, which is engaged and driven by a beveled pinion 27 mounted upon one end of a counter-shaft 28, which revolves in bearings secured to the frame 10. The shaft 28 has secured thereon a pulley 29, which is disposed beneath and in contact with the belt 15, so that an operation of this belt will impart motion to the shaft 28 to drive the gears 26 and 27 and operate the conveyer. The gears and pulley are so proportioned as to materially reduce the speed of travel or operation of the conveyer with respect to the speed of the saw.

In the operation of the invention, the blocks or pieces of wood cut by the saw 13 will fall into the trough upon the conveyer or upon the ribs or rods 24 and be carried over these ribs or rods in a manner to materially reduce friction, so that the amount of power necessary for the operation of the conveyer is reduced, permitting the same to be operated by the saw operating mechanism without increasing the power of the latter.

The invention is susceptible of various changes in its form, proportions and minor details of construction and the right is herein reserved to make such changes as properly fall within the scope of the appended claim.

Having described the invention, what is claimed is:

A conveyer of the character described comprising a bottom wall arranged at an inclination and supported at its lower end, outwardly inclined side walls rising from said bottom wall and in contacting engagement with the side edges thereof, transversely disposed shafts journalled in the ends of the bottom wall, a sprocket carried by the ends of each shaft, chains trained over the sprockets, substantially L-shaped carriers secured to the chains and being disposed transversely thereof, a plurality of spaced parallel longitudinally disposed rods bent downwardly at their ends to conform to the curvature of the turning point of said chains and being secured to and spaced from the bottom wall as and for the purpose specified.

In testimony whereof I affix my signature.

SAMUEL L. EUSTIS, JR.